Patented Sept. 7, 1954

2,688,619

UNITED STATES PATENT OFFICE 2,688,619

PHTHALIMIDO PYRIMIDINES AND METHOD FOR THEIR PRODUCTION

John E. Mahan and Stanley D. Turk, Bartlesville, Okla., assignors to Phillips Petroleum Company, a corporation of Delaware No Drawing. Application September 14, 1951, Serial No. 246,709

9 Claims. (Cl. 260—256.4)

This invention relates to new and useful chemical compositions and to a method for their preparation. In one aspect this invention relates to a method for condensing an amino pyrimidine with phthalic anhydride or a derivative of phthalic anhydride. In another aspect this invention relates to phthalimido pyrimidines as new compositions of matter.

In methods heretofore employed for condensing an amine with an anhydride, an excess of the amine is usually employed, when the amine is a liquid, or a low boiling solvent such as acetic acid is sometimes used. The amino pyrimidines employed in this invention are solid compounds and when an attempt is made to carry out the reaction in the presence of a low boiling solvent such as acetic acid, the yield of phthalimido pyrimidine is very low and the product is contaminated with the mono-phthalic acid salt of the amino pyrimidine. In all probability small amounts of the phthalimido pyrimidine are formed first. No provision is made for removing the water formed in such condensation reaction. It is left in the mixture and reacts with the phthalic anhydride to form phthalic acid which, in turn, reacts with the amino pyrimidine to form the mono-phthalic acid salt. When operating according to the process of this invention, water is removed as it is formed, thus eliminating side reactions and therefore providing a means for obtaining a high yield of the desired product.

By at least one aspect of this invention, at least one of the following objects is attained. It is an object of this invention to provide new and useful compositions of matter. It is another object of this invention to provide a method for condensing an amino pyrimidine with phthalic anhydride or a derivative thereof. It is another object of this invention to provide a method for condensing an amino pyrimidine with phthalic anhydride or a derivative thereof under such conditions that water is removed as formed. It is still another object of this invention to provide phthalimido pyrimidines. Other objects will be apparent to one skilled in the art upon reading this disclosure and the appended claims.

We have discovered phthalimido pyrimidines as new compositions of matter and a method for their production by the interaction of an amino pyrimidine with phthalic anhydride or a derivative thereof in the presence of a high boiling aliphatic or aromatic hydrocarbon solvent.

According to the process of this invention, an amino pyrimidine is condensed with phthalic anhydride or a derivative thereof in the presence of a water insoluble solvent having a boiling point substantially above that of water to give a high yield of the phthalimido pyrimidine. The mixture is refluxed and water is removed as it is formed during the reaction.

Solvents which are applicable include hydrocarbons which are inert with respect to these reactants. They include aliphatic hydrocarbons such as straight and branched chain paraffins and cycloparaffins as well as aromatics and alkyl substituted aromatics. These solvents should boil in the range of between 130° C. to 325° C. at the pressure at which the reaction is carried out. Examples of hydrocarbons which may be used include, xylene, ethylbenzene, butylbenzene, normal and branched chain dodecane, tetradecane, hexadecane, butylcyclohexane and the like. Mixtures of such inert hydrocarbons such as kerosene are also frequently employed.

Products formed by the reaction of an amino pyrimidine with phthalic anhydride or a derivative thereof can be represented by the following formula

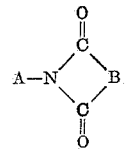

wherein A is a pyrimidine ring and B is a phenylene, dihydrophenylene, tetrahydrophenylene or hexahydrophenylene radical or a halogen, nitro, hydroxy, alkoxy or alkyl substituted phenylene radical.

Amino pyrimidines employed for the production of the phthalimido pyrimidines herein described can be presented by the formula

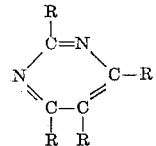

wherein at least one R is an unsubstituted amino group and the remaining R groups can be hydrogen, alkyl (with each alkyl group containing not to exceed 12 carbon atoms and the total number of carbon atoms in the alkyl groups not to exceed 20), aryl, halogen, or substituted or unsubstituted amino groups.

The phthalic anhydride derivatives which, in addition to phthalic anhydride itself, are applicable include those in which the six membered ring is substituted with from 1 to 4 substituents selected from the group consisting of halogen atoms, hydroxyl, alkoxy or alkyl radicals, and/or from 1 to 2 nitro radicals. Dihydro- and tetrahydro- and hexahydrophthalic anhydride, and derivatives thereof may also be employed.

Phthalimido pyrimidines which are produced according to the method of this invention include: 4-phthalimido-2,6-dimethylpyrimidine, 4-tetrachlorophthalimido - 2,6 - dimethylpyrimidine; 4 - tetrahydrophthalimido - 2,6 - dimethylpyrimidine, 4-dichlorophthalimido-2,6-dimethylpyrimidine, 4-tetrachlorotetrahydrophthalimido - 2,6-dimethylpyrimidine, and 4 - mononitrophthalimido-2,6-dimethylpyrimidine.

One of the phthalimido pyrimidines produced according to the process of this invention is 4-phthalimido-2,6-dimethylpyrimidine, prepared by reacting 4-amino-2,6-dimethylpyrimidine with phthalic anhydride. This compound can be represented by the formula

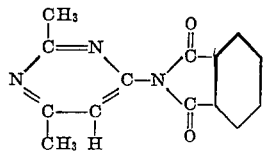

It is a white crystalline solid melting at 160–161° C.

The ratio of reactants to high boiling solvent, in parts by weight, is generally in the range from 1:3 to 1:15 with the range from 1:5 to 1:10 being most generally preferred.

The phthalimido pyrimidines of this invention are useful as rubber chemicals, agricultural chemicals, and as intermediates for the preparation of various pharmaceuticals.

Example I 4-phthalimido - 2,6 - dimethylpyrimidine was prepared by dissolving 61.5 grams (0.5 mol) 4-amino-2,6-dimethylpyrimidine in 1250 ml. (approximately 962 grams) kerosene and adding 74 grams (0.5 mol) phthalic anhydride. The mixture was refluxed with stirring at atmospheric pressure and 190° to 195° C. for 3.5 hours during which time 8.9 cc. water was removed. After cooling to room temperature, filtering, and washing with pentane, 115 grams of the solid product was obtained representing a yield of 91.2 per cent. The product had a melting point of 158–160° C. Recrystallization from ethanol gave a product melting at 160–161° C.

Example II

An attempt was made to prepare 4-phthalimido-2,6-dimethylpyrimidine by effecting the condensation of 4-amino-2,6-dimethylpyrimidine with phthalic anhydride in the presence of glacial acetic acid. One tenth mol each of the pyrimidine and phthalic anhydride and 150 cc. glacial acetic acid were refluxed at atmospheric pressure and 118° C. for 26 hours during which time no water was removed. The acetic acid was removed under reduced pressure. A dry solid was obtained which was recrystallized from ethanol. A yield of approximately 40 per cent of the monophthalic acid salt of 4-amino-2,6-dimethylpyrimidine, melting at 206–207° C., was obtained. Analysis for carbon, hydrogen, and nitrogen helped to identify the compound. A small amount, about 10–15 per cent, of 4-phthalimido-2,6-dimethylpyrimidine was recovered from the filtrate. It was contaminated with the phthalic acid salt of the amino pyrimidine.

Example III

4 - tetrachlorophthalimido-2,6-dimethylpyrimidine was prepared by refluxing a mixture of 0.2 mol 4-amino - 2,6 - dimethylpyrimidine, 0.2 mol tetrachlorophthalic anhydride and 500 cc. (approximately 385 grams) kerosene for 3 hours at atmospheric pressure and 190° to 195° C. During the refluxing period 3.5 cc. of water was removed. The mixture was cooled to room temperature and filtered, and 72 grams of the crude product was obtained which represented a yield of 90 per cent. After crystallization from o-dichlorobenzene, the pure material had a melting point of 246–247° C.

The reaction of this invention is preferably carried out at a temperature in the range of about 130 to 325° C., but temperatures somewhat higher or lower can also be employed. Preferably atmospheric pressure is employed, in order to eliminate problems associated with the use of elevated or reduced pressures. However, it is necessary that the solvent or diluent be refluxing or boiling during the course of the reaction to remove the water from the reaction zone. If it is desired to employ a given solvent and a reaction temperature differing from the normal boiling point of this solvent, it will be necessary to adjust the pressure accordingly. Reaction times ranging generally between 1–10 hours are utilized though longer periods of time may be used. The mol ratio of reactants is generally maintained in the vicinity of 1:1 although an excess of either reactant may be used.

Reasonable variations and modifications are possible within the scope of the disclosure of the invention, the essence of which is providing phthalimido pyrimidines as new compositions of matter and providing for a method for producing the said new compositions of matter.

I claim:
1. Phthalimido pyrimidines characterized by the formula

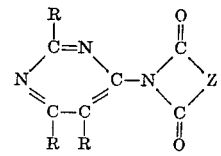

wherein R is selected from the group consisting of hydrogen and methyl radicals; and Z is a divalent radical selected from the group consisting of ortho-phenylene, hydrogenated ortho-phenylene, chlorinated ortho-phenylene, and nitrated ortho-phenylene.

2. 4-phthalimido-2,6-dimethylpyrimidine.

3. 4-tetrahydrophthalimido - 2,6 - dimethylpyrimidine.

4. A method for producing phthalimido pyrimidines which comprises reacting an amino pyrimidine characterized by the formula

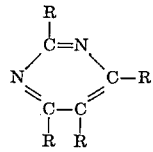

wherein one R is an unsubstituted amino radical and the remaining R's are selected from the group consisting of an amino radical, hydrogen, halogen, phenyl and an alkyl radical containing not more than 12 carbon atoms and wherein the total number of carbon atoms in the alkyl radicals does not exceed 20, with a member of the group consisting of phthalic anhydride and phthalic anhydride derivatives characterized by the formula

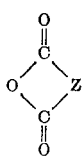

wherein Z is a divalent radical selected from the group consisting of unsubstituted and substituted orthophenylene, dihydroorthophenylene, tetrahydroorthophenylene and hexahydroorthophenylene radicals, the substituted radicals containing substituents selected from the group consisting of halogen atoms, nitro radicals, hydroxy radicals, alkoxy radicals and alkyl radicals, wherein the total carbon atoms in the alkyl radicals are not more than 12; in the presence of an inert solvent having a boiling point higher than 130° C. at a temperature higher than 130° C. at substantially atmospheric pressure for a time sufficient to cause interaction of the said reactants and removing water as it is formed.

5. A method according to claim 7 wherein the solvent is selected from the group consisting of aliphatic hydrocarbons and aromatic hydrocarbons having a boiling point in the range 130° to 325° C.

6. A method for producing 4-tetrahydrophthalimido-2,6-dimethylpyrimidine which comprises contacting 4-amino-2,6-dimethylpyrimidine with tetrahydrophthalic anhydride in the presence of an excess of kerosene at substantially atmospheric pressure and at a temperature within the range 130° to 325° C. for a time sufficient so as to cause interaction of the said 4-amino-2,6-dimethylpyrimidine and the said tetrahydrophthalic anhydride and removing water as it is formed.

7. A method for producing 4 - tetrachlorophthalimido-2,6-dimethylpyrimidine which comprises contacting 4-amino-2,6-dimethylpyrimidine and tetrachlorophthalic anhydride in the presence of an excess of kerosene at substantially atmospheric pressure and at a temperature within the range 130° to 325° C. for a time sufficient so as to cause interaction of the said 4-amino-2,6-dimethylpyrimidine and the said tetrachlorophthalic anhydride and removing water as it is formed.

8. 4-tetrachlorophthalimido - 2,6 - dimethylpyrimidine.

9. A method for producing 4-phthalimido-2,6-dimethylpyrimidine which comprises contacting 4-amino-2,6-dimethylpyrimidine with phthalic anhydride in the presence of an excess of kerosene at substantially atmospheric pressure and at a temperature within the range 130° to 325° C. for a time sufficient so as to cause interaction of the said 4-amino-2,6-dimethylpyrimidine and the said phthalic anhydride and removing water as it is formed.

No references cited.